(12) United States Patent
Vaughan

(10) Patent No.: US 6,706,301 B2
(45) Date of Patent: Mar. 16, 2004

(54) TANDOORI COOKING METHOD AND APPARATUS

(76) Inventor: Nicholas John Vaughan, 85b Main Road, Gidea Park, Romford, Essex RM2 5EL (GB)

( * ) Notice: Subject to any disclaimer, the term of this patent is extended or adjusted under 35 U.S.C. 154(b) by 0 days.

(21) Appl. No.: 09/782,377

(22) Filed: Feb. 12, 2001

(65) Prior Publication Data

US 2002/0018834 A1 Feb. 14, 2002

Related U.S. Application Data

(63) Continuation of application No. 09/402,283, filed on Oct. 1, 1999, now abandoned.

(30) Foreign Application Priority Data

| Apr. 1, 1997 | (GB) | ................................................ 9706539 |
| Jun. 5, 1997 | (GB) | ................................................ 9711590 |
| Nov. 27, 1997 | (GB) | ................................................ 9725065 |

(51) Int. Cl.[7] .................................................. A47J 37/07
(52) U.S. Cl. ...................... 426/466; 426/523; 99/340; 99/419; 99/421 R; 99/448; 99/450; 99/482
(58) Field of Search ................................ 426/523, 652, 426/466, 134; 99/419, 340, 421 A, 421 V, 421 R, 448, 426, 482, 450; 126/30; 211/125

(56) References Cited

U.S. PATENT DOCUMENTS 116,083 A * 6/1871 Murdock

| 1,782,639 A | * | 11/1930 | Van Allen |
| 1,887,219 A | * | 11/1932 | Stranszky |
| 2,766,682 A | * | 10/1956 | Smith .......................... 99/419 |
| 3,038,402 A | * | 6/1962 | Singer ......................... 99/403 |
| 4,372,199 A | * | 2/1983 | Brown et al. ................. 99/341 |
| 4,612,851 A | * | 9/1986 | McManus .................... 99/419 |
| 5,564,330 A | * | 10/1996 | Nowicke, Sr. ............... 99/340 |

FOREIGN PATENT DOCUMENTS

GB 2135627 A * 9/1984

OTHER PUBLICATIONS

Julie Sahni, Classic Indian Cooking, 1980 William Morrow and Company, New York, pp. 80–82.*

* cited by examiner

Primary Examiner—Drew Becker
(74) Attorney, Agent, or Firm—Thomas M. Freiburger

(57) ABSTRACT

The cooking apparatus comprises a heat source within an enclosure, and a hollow chamber with an open upper and lower end which sits on or above the heat source. The hollow chamber together with the enclosure provide a cooking apparatus which has a bulbous, convex form. The chamber may be an accessory which can be removably attached to a barbecue, and it is preferably made from clay or metal. Optionally, skewers may form part of the apparatus, and they may be positioned vertically within the chamber to cook any food thereon. The skewers are preferably solid or hollow, and are longer than the height of the hollow chamber. A lid may be provided for the upper end of the chamber, and holes may be formed in the boundary of the upper opening to support the skewers. A vent may be provided in the lower region of the hollow chamber, or in the enclosure which is adjustable to regulate the size of the opening.

6 Claims, 2 Drawing Sheets

TANDOORI COOKING METHOD AND APPARATUS

This application is a continuation of application Ser. No. 09/402,283, filed Oct. 1, 1999 now abandoned.

TECHNICAL FIELD

This invention relates to cooking apparatus and methods of cooking.

BACKGROUND ART

It is known to cook foodstuffs by grilling them over a heat source, e.g. an open fire provided, for example, by burning charcoal, coal or other pyrogenous material in a barbecue. It is also known to effect such grilling, particularly barbecue grilling, by impaling the foodstuff on skewers that are positioned in a raised horizontal position spaced above the heat source and allowing the heat to embrace the impaled foodstuff. It is often difficult to ensure proper and even cooking of foodstuffs by these methods and it is considered desirable to overcome these and/or other difficulties arising from the apparatus and methods of the prior art.

SUMMARY OF THE INVENTION

According to a first aspect of this invention there is provided a method of cooking foodstuff items impaled on skewers characterised in that the skewers are disposed in a generally upright attitude upon or above a heat source and in that the skewers are surrounded by a hollow chamber provided with an open bottom above the heat source and with an open top from which handles of the skewers extend.

Preferably the lower ends of the skewers rest on the heat source.

According to another aspect of this invention there is provided apparatus for use in a method according to said first aspect of the invention, said apparatus comprising a hollow chamber having an open upper end and an open lower end, the lower opening being for disposition in close proximity above (preferably upon) the heat source and having a cross-sectional area greater than that of the upper opening, and further comprising a plurality of skewers having a length commensurate with (preferably greater than) the height of the hollow chamber, i.e. the distance between its upper and lower ends.

The hollow chamber may be of metal or of clay or other suitable ceramic material.

Preferably the wall of the said chamber is of substantially uniform cross-section such that the wall is of substantially constant thickness and its exterior surface facing the ambient environment (i.e. that is to contact the outside air) conforms to its interior surface.

Advantageously the skewers are hollow along at least the majority of their length. This is to enhance heat transfer from the heat source to the foodstuff impaled on each skewer.

For example the chamber may have the following dimensions:
  height: in the range 44 to 54 cms, preferably 49 cms;
  maximum diameter: in the range 31 to 41 cms, preferably 36 cms;
  diameter of top aperture: in the range 10 to 20 cms, preferably 15 cms;
  diameter of bottom aperture: in the range 25 to 36 cms, preferably 30 cms;
and the distance from the top aperture to the chamber's transverse plane containing its maximum diameter being approximately half, preferably slightly less than half, the chamber's height.

Optionally, the hollow chamber may be provided with one or more external handles whereby the chamber may be lifted onto and/or removed from off the heat source.

Additionally or alternatively a lid may be provided for the open upper end of the hollow chamber. The lid may be multi-apertured, the apertures permitting the extension therethrough of (the) skewers. The apertures may, for example, be of triangular shape. Alternatively, the lid may fully cover the area of the open upper end, the latter being provided with slot-like apertures through which the skewers can extend.

In one example of the invention, a vent may be provided in the wall of the hollow chamber adjacent its open lower end. Advantageously this vent may be adjustable, e.g. being selectively either open or closed (preferably having the size of its opening(s) regulatable).

According to yet another aspect of this invention there is provided apparatus for use in a method according to said first aspect of the invention, said apparatus comprising a hollow chamber having an open upper end and an open lower end, the lower opening being for disposition in close proximity above (preferably upon) a heat source, the cross-sectional area of the chamber being greater at an intermediate height location between the upper end and the lower end such as to provide the chamber with a bulbous form.

BRIEF DESCRIPTION OF THE DRAWINGS

By way of example two embodiments of this invention will now be described with reference to the accompanying drawings of which.

DETAILED DESCRIPTION OF EXAMPLE(S) OF THE INVENTION

Figure 1:
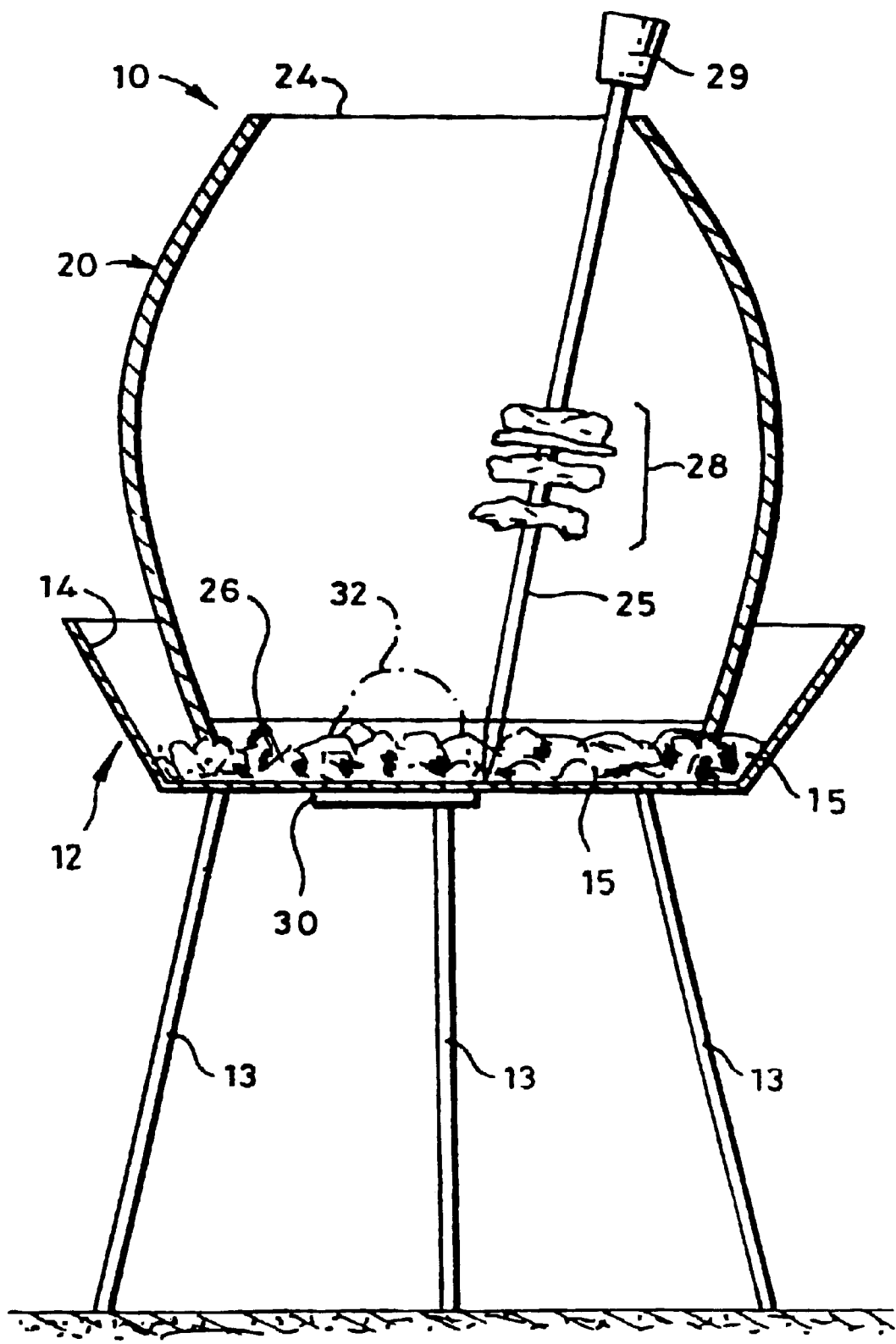
FIG. 1 is a schematic vertical cross-sectional view through cooking apparatus according to one embodiment of this invention.

The illustrated apparatus 10 of FIG. 1 comprises a barbecue 12 and accessory 20 therefor. The barbecue comprises a brazier dish 14 supported by three equi-angularly spaced legs 13. For use, either alone as a barbecue, or together with the accessory 20, charcoal or like pyrogenous material 15 is placed within the brazier dish 14 and ignited. The accessory 20 is a hollow structure which defines a chamber 22 of generally barrel-shaped form and is in use removably supported by the pyrogenous material 15 in the brazier dish 14.

This hollow structure 20 is of an unglazed, unfired clay or other ceramic material resistant to fire and heat, preferably reinforced with hessian or other suitable strengthening fibres. After forming from the fibre-reinforced clay or other ceramic material, the hollow structure may be left to dry slowly, e.g. in a naturally warm or hot environment. Alternatively, the hollow structure 20 may be made of metal (e.g. enamelled with a heat-resistant vitreous finish) or of a combination of (such) metal and ceramic materials. The thickness of the chamber wall is of substantially uniform cross-section such that the wall's exterior surface facing the ambient environment, i.e. the outside air, is generally conformingly parallel to its interior surface.

The hollow structure 20 is open at each end and, in this example, is approximately 40 cm high. The circular upper opening 24 of chamber 22 is approximately 15 cms in diameter, and the circular lower opening 26 of chamber 22—which is larger than the upper opening 24—is approximately 30 cms in diameter. The maximum diameter of the generally barrel-shaped chamber 22 is approximately 38 cms and is located slightly above the horizontal plane lying mid-way between the upper and lower openings 24, 26.

For use, charcoal or pyrogenous material 15 is placed in the brazier dish 14 of the barbecue 12, with the structure 20 removed, and this material is then ignited. The hollow structure 20 is then placed on top of the burning material 15. Foodstuff items 28 that are to be cooked (e.g. meat and/or fish)—which optionally may have been previously steeped in a marinade—are pushed onto metal skewers 25 having heat-insulated handles 29. These skewers 25 are then inserted through the structure's top opening 24 to rest stationary with their pointed lower ends on the charcoal or pyrogenous material 15 and to lie, in a slightly inclined but generally upright attitude, against the bounding rim of the opening 24 (with their handles 29 projecting to the outside). The heat from the burning material 15 is conducted along the metal skewers 25 to cook the foodstuff items 28 internally, whilst the radiated and convected heat from the charcoal or other pyrogenous material 15 is imparted to the exterior of the foodstuff items 28 to cook them—and additionally to flavour them when the charcoal or other pyrogenous material 15 is of an aromatic nature. The metal skewers 25 may optionally be hollow along at least the majority of their length to enhance heat transfer from the heat source to the foodstuff items 28 impaled thereon.

Breads can also be cooked in the above-described apparatus by adhering the flattened cakes of dough to the internal wall surface of the hollow chamber 20.

If the air supply to the burning material 15 needs to be improved, the barbecue 12 may be modified to incorporate a vent 30 in the bottom wall of brazier 14, and this vent may be adjustable to vary the airflow therethrough. Such a vent 30 may comprise first and second superimposed elements each provided with a like regular array of openings having between them non-apertured zones dimensioned similarly to the openings whereby, in one extreme position the openings of one element are in registry with the openings of the other element, and in another extreme position the openings of one element are occluded by the non-apertured zones of the other element. With such a vent formation, the vent can be selectively fully open, or fully closed, or partially open in a regulatable manner by varying the areas of the openings that are mutually superimposed.

Alternatively or additionally, and for the same purpose, the hollow structure 20 may be formed with a permanent opening, e.g. as at 32, in its side wall at or adjacent to its bottom. This opening may be either contigous with or separate from the bottom opening 26 provided on the hollow structure 20.

It will be appreciated that, apart from use in the manner described above, the hollow structure 20 may be removed to permit the barbecue to be used alone in a conventional way with foodstuff items being placed directly on burning material 15 or upon an intervening grille (not shown)—the latter being removed when use with the hollow structure 20 is desired. It will thus be appreciated that the hollow structure 20 can be made and/or sold separately for use with an existing barbecue (e.g. a fixed brick-built barbecue), or can be made and/or sold in conjunction with a barbecue as a combination (suitable for the multiple types of use described above by way of example). In the latter case the structure 20 may be configured such that its lower end can be fittingly received within the barbecue's brazier dish.

It will be appreciated that the hollow structure 20 may be of fired clay (reinforced or not) rather than non-fired, or of metal, or can be of some other suitable heat-resistant material. Furthermore the hollow structure 20 can alternatively, or additionally, be used in conjunction with a cooking heat source other than a conventional barbecue—one example being a gas burner.

It will also be appreciated that the hollow chamber may be provided with one or more external handles whereby the chamber may be lifted onto and/or removed from off the heat source.

Additionally or alternatively a multi-apertured lid may be provided for the open upper end of the hollow chamber, the apertures permitting the extension therethrough of the skewers 25. The apertures in the lid may, for example, be of triangular shape. As an alternative to this feature, the lid may extend fully over the area of the open upper end, the latter having slot-like apertures in its boundary through which the skewers can extend.

Figure 2:
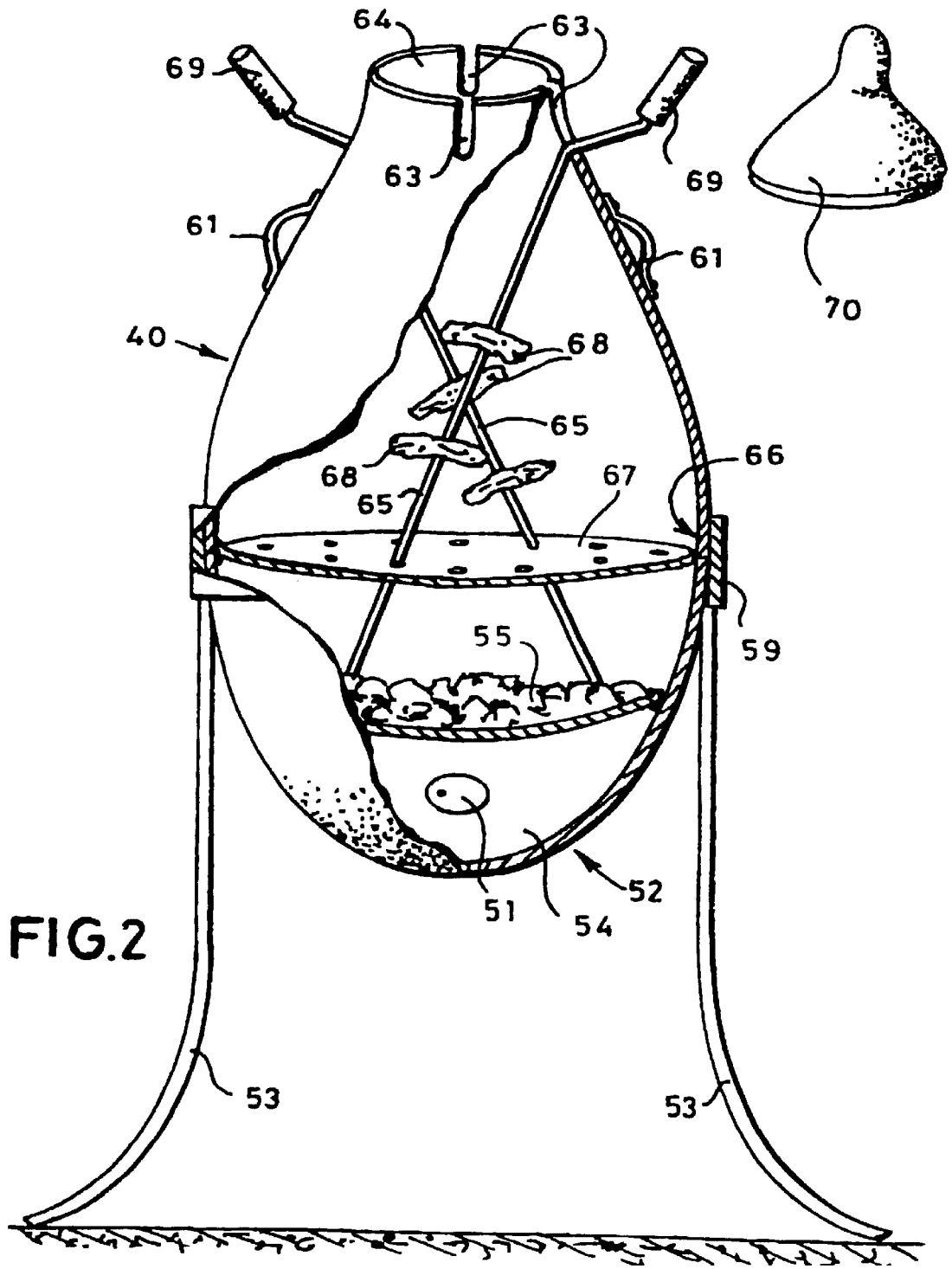
FIG. 2 is a similar view of cooking apparatus according to a second embodiment of this invention.

The illustrated apparatus 40 of FIG. 2 comprises a barbecue 52 which comprises a bowl-shaped brazier dish 54 supported (e.g. approximately 40 cm from the ground) by three equi-angularly spaced legs 53 The barbecue 52 can be used alone in a conventional manner or, in accord with this invention, with an accessory 60 comprising a hollow tapering structure removably attached to the rim of the bowl-shaped brazier dish 54 by a coupling 59 so as to define, with dish 54, a chamber 62 of generally barrel-shaped form. The coupling 50 allows the accessory 60 to be removably placed above the pyrogenous material 55 (in brazier dish 54) after the latter has been ignited.

This hollow structure 60 is made of metal (e.g. enamelled with a heat-resistant vitreous finish) or of a combination of (such) metal and ceramic materials. The thickness of the chamber wall is of substantially uniform cross-section such that the wall's exterior surface facing the ambient environment, i.e. facing the outside air, is generally conformingly parallel to its interior surface.

The hollow structure 60 is open at each end and in this example, is approximately 49 cm in height. The circular upper opening 64 of chamber 62 is defined by a tubular neck approximately 5 cm high and 15 cms in diameter, and the circular lower opening 66 of chamber 22—which is larger than the upper opening 64—is approximately 30 cms in diameter, this being approximately the maximum diameter of the generally bowl-shaped brazier dish 54.

A removable grille or like multi-apertured, disc-like plate 67 is provided at the join between brazier dish 54 and the chimney-like structure 60—approximately 11 cm above the top of the pyrogenous material 55 in brazier 54.

For use, charcoal or pyrogenous material 55 is placed in the brazier dish 54 of the barbecue 52, with the structure 60 and plate 67 removed, and this pyrogenous material is then ignited. The plate 67 and hollow structure 60 are then placed on top of the dish 54 so as to be located—and fixed by coupling 59—above the burning material 55. Foodstuff items 68 that are to be cooked (e.g. meat, and/or fish)—which optionally may have been previously steeped in a marinade—are pushed onto metal skewers 65. These skewers 65, which have heat-insulated handles 69 provided as a dog-leg or cranked extension of the elongate metal shaft of the skewers, are then inserted through the structure's top opening 24 to rest with their pointed lower ends on the charcoal or pyrogenous material 55 and to lie stationary, in a generally upright and inclined attitude, against the bounding rim of the opening 24 (with their handles 69 projecting to the outside). Optionally, the neck that defines the upper opening 64 may be provided with slot-like apertures 63 to retain the skewers in position.

The heat from the burning material 55 is conducted along the metal skewers 65 to cook the foodstuff items 68 internally, whilst the radiated and convected heat from the charcoal or other pyrogenous material 55 is imparted to the exterior of the foodstuff items 68 to cook them—and additionally to flavour them when the charcoal or other pyrogenous material 55 is of an aromatic nature. The metal shafts of the skewers 65 may optionally be hollow along at least the majority of their length to enhance heat transfer from the heat source to the foodstuff items 68 impaled thereon.

If the air supply to the burning material 55 needs to be improved, the barbecue 62 may be modified to incorporate a vent 51 in the bottom wall of brazier 54, and this vent may be adjustable to vary the airflow therethrough. Such a vent 51 may comprise first and second superimposed elements each provided with a like regular array of openings having between them non-apertured zones dimensioned similarly to the openings whereby, in one extreme position the openings of one element are in registry with the openings of the other element, and in another extreme position the openings of one element are occluded by the non-apertured zones of the other element. With such a vent formation, the vent can be selectively fully open, or fully closed, or partially open in a regulatable manner by varying the areas of the openings that are mutually superimposed.

It will be appreciated that, apart from use in the manner described above, the hollow structure 60 may be removed to permit the barbecue to be used alone in a conventional way with foodstuff items being placed directly on burning material 55 or upon grille 67. It will thus be appreciated that the hollow structure 60 can be made and/or sold separately as an accessory, for use with an existing pre-sold barbecue, or can be made and/or sold in conjunction with a barbecue as a combination (suitable for the multiple types of use described above by way of example). In the latter case the structure 60 may be configured such that its lower end can be fittingly mounted on the barbecue's brazier dish.

It will be appreciated that the hollow structure 60 may be used in conjunction with a cooking heat source other than a conventional barbecue—one example being a gas burner.

It will also be appreciated that the hollow chamber 60 may be provided with one or more external handles 61 whereby the chamber may be lifted onto and/or removed from off the heat source.

Additionally or alternatively a lid 70 may be provided for the open upper end 64 of hollow chamber 62. The lid 70 fits into the neck 64 and extends fully over the area of the open upper end, the latter having slot-like apertures 63 in its boundary through which the skewers can extend, In one alternative construction, the accessory 20 or 60 may be provided integral with, and non-separable from, the heat source 12 or 52 (shown in FIGS. 1 and 2 as a barbecue). Such an arrangement is considered particularly feasible, say, where the heat source is provided by a gas burner.

In yet another alternative, the pyrogenous material (gas, charcoal, wood or the like) is ignited after the accessory 20 or 60 is in position.

Other modifications and embodiments of the invention, which will be readily apparent to those skilled in this art, are to be deemed within the ambit and scope of the invention defined in the following Claims, and the particular embodiment(s) hereinbefore described may be varied in construction and detail, e.g. by interchanging (where appropriate or desired) different features of each, without departing from the scope of the patent monopoly expressed by these Claims. Thus, for example, the skewers 65 of FIG. 2 may have in-line handles such as 29 rather than the cranked handles 69 illustrated.

What is claimed is:

1. A method of cooking foodstuff comprising the steps of:
    (A) (a) providing a cooking apparatus adaptable between first and second states, wherein said apparatus comprises a heat source including an enclosure having an open mouth and a hollow chamber having an upper end provided with an opening having a first area and a lower end provided with an opening having a second area substantially greater than said first area, said hollow chamber being removably placeable in a position relative to the heat source such that, when in said position, the chamber's said lower end is proximal to and above said heat source, and
        (b) the hollow chamber shaped and dimensioned such that, when in said position, the hollow chamber provides the apparatus with a cooking chamber of bulbous form;
    (B) selecting between first and second modes of cooking and, for said first mode,
        (1)(i) adapting the apparatus to the first state by removing the hollow chamber from said position and, thereafter,
        (1)(ii) placing said foodstuff in close proximity to the open mouth of the hear source to be cooked by said heat source,
    or, for said second mode,
        (2)(i) adapting the apparatus to the second state by providing that the hollow chamber is placed in said position and, thereafter,
        (2)(ii) inserting into said hollow chamber at least one skewer having foodstuff impaled thereon, via the upper opening at the upper end of the hollow chamber such as to rest, loosely, on the heat source, such that the impaled foodstuff is cooked primarily by thermal convection currents derived from the heat source and circulating within the hollow chamber, and subsequently removing the skewer with cooked foodstuff impaled thereon from the apparatus by withdrawal through said opening at the upper end of the hollow chamber.

2. A method for using a cooking apparatus to cook food items in two different cooking modes, comprising:
    providing a cooking apparatus with a first section including a heat source and comprising a barbecue with an open top, a second section comprising a hollow chamber with an open upper end of a first dimension and an open lower end of a second dimension substantially greater than the first dimensions and the lower end removably attached to the first section, resting on top of the first section in substantially closed relationship with the first section as to form from the first and second sections a bulbous shape, a grill dimensioned to fit on the first section, and a plurality of skewers of length sufficient to extend down through the hollow chamber such that upper ends of the skewers can extend out the upper end of the second section;
    when it is desired to barbecue food, in one mode of cooking, lifting the second section off the first section, activating the heat source and cooking food items directly on the grill with the grill in place on the first section; and
    when a second mode of cooking is desired wherein food items are cooked from both inside and out, placing the second section on top of the first section to form the bulbous shape with the hollow chamber extending up from the heat source, impaling food items onto a plurality of the skewers, and with the heat source activated, placing the skewers in through the open top of the second section such that the upper ends of the skewers extend out the top of the hollow chamber for retrieval when the food items have been cooked.

3. A cooking apparatus for cooking food items in either of two cooking modes, comprising:
- a first section including a heat source, the first section comprising a barbecue with an open top,
- a second section comprising a hollow chamber having an open upper end of a first dimension and an open lower end of a second dimension substantially greater than the first dimension and the lower end removably attached to the first section, resting on top of the first section in substantially closed relationship with the first section so as to form from the first and second sections a bulbous shape,
- a plurality of skewers with food items impaled on the skewers, the skewers being placed in the hollow chamber of the second section in generally upright position and such that upper ends of the skewers extend out from the open upper end of the second section,
- a grill dimensioned to fit on the first section such that the first section is useful without the second section, when desired, to barbecue food items resting on the grill, in a first cooking mode,
- whereby the cooking apparatus can be used without the second section in the first cooking mode as a barbecue, with the heat source cooking food items resting on the grill, and, when desired, the cooking apparatus can be used with the second section resting on toe first section to form said bulbous shape and forming a heat chamber in the hollow chamber such that food items impaled on the skewers are cooked from within, by induction of heat by the skewers, and from without, by heat surrounding the food items within the hollow chamber.

4. The cooking apparatus of claim 3, wherein the open upper end of the second section has a plurality of slots arranged in peripheral positions to receive the skewers in inclined but generally upright attitude.

5. The cooking apparatus of claim 3, wherein said cooking apparatus with the second section resting on the first section forms generally a pear shape.

6. A cooking apparatus for cooking food items in either of two cooking modes, comprising:
- a first section including a heat source, the first section comprising a barbecue with an open top,
- a second section comprising a hollow chamber having an open upper end of a first dimension and an open lower end of a second dimension substantially greater than the first dimension and the lower end removably attached to the first section, resting on top of the first section and to provide the apparatus with a substantially bulbous shape,
- a plurality of skewers with food items impaled on the skewers, the skewers being placed in the hollow chamber of the second section in generally upright position and such that upper ends of the skewers extend our from the open upper end of the second section,
- a grill dimensioned to fit on the first section such that the first section is useful without the second section, when desired, to barbecue food items resting on the grill, in a first cooking mode,
- whereby the cooking apparatus can be used without the second section in the first cooking mode as a barbecue, with the heat source cooking food items resting on the grill, and, when desired, the cooking apparatus can be used with the second section resting on the first section to form said substantially bulbous shape and forming a heat chamber in the hollow chamber such that food items impaled on the skewers are cooked from within, by induction of heat by the skewers, and from without, by heat surrounding the food items within the hollow chamber.

* * * * *